(12) United States Patent
Babu

(10) Patent No.: US 11,746,829 B2
(45) Date of Patent: Sep. 5, 2023

(54) SENSOR BEARING ASSEMBLY

(71) Applicant: AKTIEBOLAGET SKF, Gothenburg (SE)

(72) Inventor: Manoj M Babu, Hosur (IN)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 17/740,492

(22) Filed: May 10, 2022

(65) Prior Publication Data

US 2022/0364601 A1 Nov. 17, 2022

(30) Foreign Application Priority Data

May 17, 2021 (IN) .............................. 202141022133

(51) Int. Cl.
*F16C 19/06* (2006.01)
*F16C 41/00* (2006.01)
*F16C 33/58* (2006.01)

(52) U.S. Cl.
CPC ............ *F16C 41/007* (2013.01); *F16C 19/06* (2013.01); *F16C 33/586* (2013.01); *F16C 2326/02* (2013.01)

(58) Field of Classification Search
CPC ...... F16C 19/06; F16C 33/586; F16C 41/007; F16C 2326/02; F16C 2326/20; F16C 2326/28
See application file for complete search history.

(56) References Cited

U.S. PATENT DOCUMENTS

2019/0024720 A1\* 1/2019 Tedeschini .............. G01P 3/443

FOREIGN PATENT DOCUMENTS

| DE | 102011084261 B4 * | 11/2015 | ............ F16C 35/063 |
|---|---|---|---|
| WO | WO-2011121384 A1 * | 10/2011 | .............. F16C 35/06 |
| WO | 2012046122 A1 | 4/2012 | |
| WO | WO-2012085617 A1 * | 6/2012 | .......... F16C 33/7886 |
| WO | 2015010737 A1 | 1/2015 | |
| WO | 2015117670 A1 | 8/2015 | |

\* cited by examiner

*Primary Examiner* — Phillip A Johnson
(74) *Attorney, Agent, or Firm* — J-TEK LAW PLLC; Scott T. Wakeman; Mark A. Ussai

(57) ABSTRACT

A sensor bearing assembly includes a bearing having an inner ring and an outer ring centered on an axis, an impulse ring secured to the outer ring of the bearing, and a sensor device for detecting rotational parameters of the impulse ring. The sensor device includes a sensor housing and at least one sensor element supported by the sensor housing and cooperating with the impulse ring. Also an annular spacer adapted to axially abut against a lateral face of the inner ring of the bearing. The sensor housing is fixedly secured to the spacer, the inner diameter of the spacer is equal to the inner diameter of the inner ring of the bearing, and the outer diameter of the impulse ring is less than or equal to the outer diameter of the outer ring of the bearing.

16 Claims, 6 Drawing Sheets

SENSOR BEARING ASSEMBLY

CROSS-REFERENCE

This application claims priority to Indian patent application no. 202141022133 filed on May 17, 2021, the contents of which are fully incorporated herein by reference.

TECHNOLOGICAL FIELD

The present disclosure is directed to a sensor bearing assembly comprising a bearing, an impulse ring, a sensor device and a spacer supporting the sensor device. The present disclosure is also directed to a sensor bearing assembly particularly adapted for a vehicle such as a motorbike, a bicycle, a tricycle or a quad.

BACKGROUND

Today, sensor bearing assemblies or units are commonly used in a wide range of technical fields, for example in the automotive industry and aeronautics. These units provide high quality signals and transmissions, while allowing integration in simpler and more compact apparatus.

A sensor bearing unit generally comprises a bearing, an impulse ring secured to the rotatable ring of the bearing, and a sensor unit or device in order to determine the angular position of the impulse ring with respect to the fixed ring of the bearing.

WO 2015/010737 A1 discloses an example of a sensor bearing unit equipping a two-wheeled vehicle axle. The sensor bearing unit comprises an impulse ring secured to the outer ring of the rolling bearing, a spacer mounted into the bore of the inner ring, and a sensor device comprising a sensor housing freely mounted onto the spacer.

With such solution, it is necessary to foresee a specific shape on the axle of the two-wheeled vehicle intended to receive the sensor bearing unit. It is also the case for the fork in order to lock in rotation the sensor device.

SUMMARY

One aim of the present disclosure is to overcome these drawbacks.

The disclosure relates to a sensor bearing assembly comprising a bearing having an inner ring and an outer ring centered on an axis, an impulse ring secured to the outer ring of the bearing, and a sensor device for detecting rotational parameters of the impulse ring, the sensor including a sensor housing and at least one sensor element supported by the sensor housing and cooperating with the impulse ring.

The sensor bearing assembly further comprises an annular spacer adapted to axially abut against a lateral face of the inner ring of the bearing.

According to a first general feature, the sensor housing of the sensor device is fixedly secured onto the spacer.

According to a second general feature, the inner diameter of the spacer is equal to the inner diameter of the inner ring of the bearing.

According to a third general feature, the outer diameter of the impulse ring is less than or equal to the outer diameter of the outer ring of the bearing.

With such a design, it is not necessary to foresee a specific shape on the fork of the vehicle to angularly secure the sensor device. Besides, the spacer does not protrude radially inwards relative to the inner ring of the bearing and the impulse ring does not protrude radially outwards relative to the outer ring. The radial boundary dimension of the sensor bearing assembly is identical to that of the bearing. Accordingly, it is not necessary to foresee specific shapes on the axle and the hub of the vehicle.

The sensor bearing assembly may be supplied as a kit with the spacer and the sensor device separated from the bearing. Alternatively, the sensor bearing assembly may be supplied as a single unit with the spacer secured to the inner ring of the bearing.

In one embodiment, the impulse ring comprises a radial portion facing a lateral face of the outer ring of the bearing and at least one opening extending through the thickness of the radial portion such that a part of the lateral face of the outer ring of the bearing is accessible from the outside through the opening.

The through-opening of the impulse ring enables a tool to axially push directly on the lateral face of the outer ring of the bearing during the installation of the sensor bearing assembly.

This leads to a simplified mounting of the sensor bearing assembly without damage to the impulse ring.

Preferably, the opening of the impulse ring is radially located between the cylindrical bore and the cylindrical outer surface of the outer ring of the bearing. For example, the opening of the impulse ring may extend over an angular sector of from 35° to 55°.

In one embodiment, the impulse ring comprises a plurality of openings spaced apart in the circumferential direction.

Preferably, the impulse ring is secured directly to the outer ring of the bearing without interposition of an additional element between the outer ring and the impulse ring.

In one embodiment, the impulse ring is secured into a groove formed on the outer surface of the outer ring of the bearing. Accordingly, the impulse ring is not secured into a groove formed on the bore of the outer ring. Therefore, if necessary, the bearing may be provided with seals each secured into a groove formed on the bore of the outer ring. The seals may be radially disposed between the inner and outer rings.

The impulse ring may be provided with a snapping portion engaged partly inside the groove of the outer ring, the snapping portion having a L-shape in cross-section. The snapping portion of the impulse ring may comprise a plurality of axial lugs spaced apart in the circumferential direction and each provided with a radial hook engaged inside the groove of the outer ring. This facilitates the deformation of the snapping portion of the impulse ring for its mounting inside the groove.

One opening of the impulse ring may be disposed circumferentially between two successive axial lugs of the snapping portion of the impulse ring.

In another embodiment the impulse ring may be secured to the outer ring of the bearing by rivets or by dowel pins or by gluing.

Preferably, the sensor housing of the sensor device defines a closed space and the sensor element is located inside the closed space. Accordingly, the sensor element is protected from external pollutants.

In one embodiment, the sensor housing of the sensor device comprises an annular inner axial portion fixedly secured onto the spacer, an annular outer axial portion radially surrounding the inner axial portion, and opposite annular radial portions extending between the inner and outer axial portions, the closed space being delimited by the inner and outer axial portions and the radial portions.

In one embodiment, the impulse ring is made of metal and provided with alternating teeth and apertures and the sensor element of the sensor device is capable to sense the metal impulse ring teeth and apertures.

Advantageously, the assembly further comprises a friction ring mounted on the outer surface of the sensor housing of the sensor device defining the outer diameter of the sensor housing, and a seal arranged around the friction ring and having at least one lip in friction contact with the friction ring.

This increases the robustness of the assembly by eliminating the probability of external pollutants going towards the impulse ring in the path of sensing.

The lip of the seal may be in radial and/or in axial friction contact with the friction ring.

Preferably, the outer diameter of the friction ring is smaller or equal to the outer diameter of the outer ring of the bearing.

BRIEF DESCRIPTION OF THE DRAWINGS

The present invention and its advantages will be better understood by studying the detailed description of a specific embodiment given by way of non-limiting example and illustrated by the appended drawings on which.

DETAILED DESCRIPTION

Figure 1:
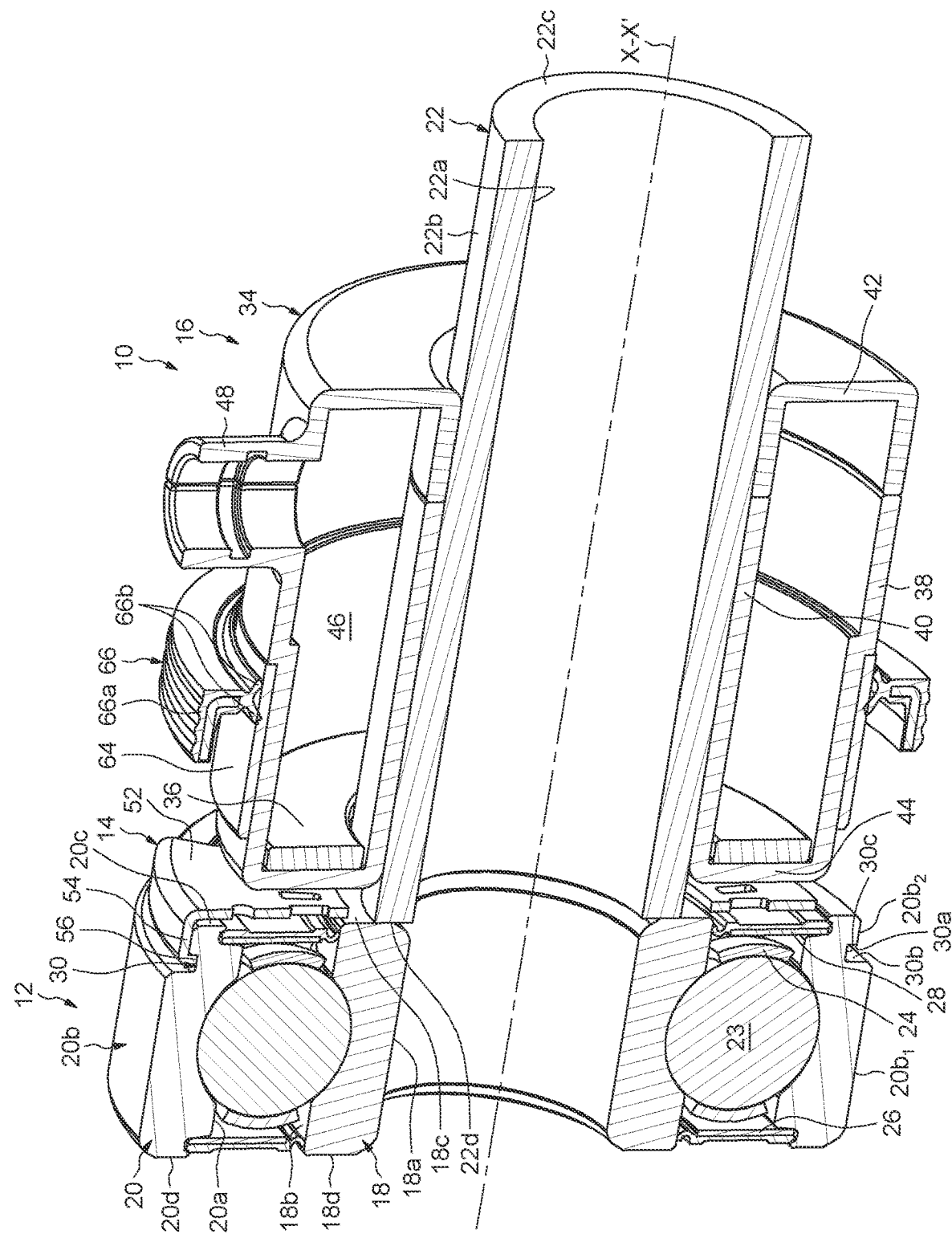
FIG. 1 is an axial perspective section view of a sensor bearing assembly according to a first example of the disclosure.

The sensor bearing assembly 10 represented in FIG. 1 is particularly adapted to equip a vehicle such as a motorbike, a bicycle, a tricycle or a quad.

Figure 2:
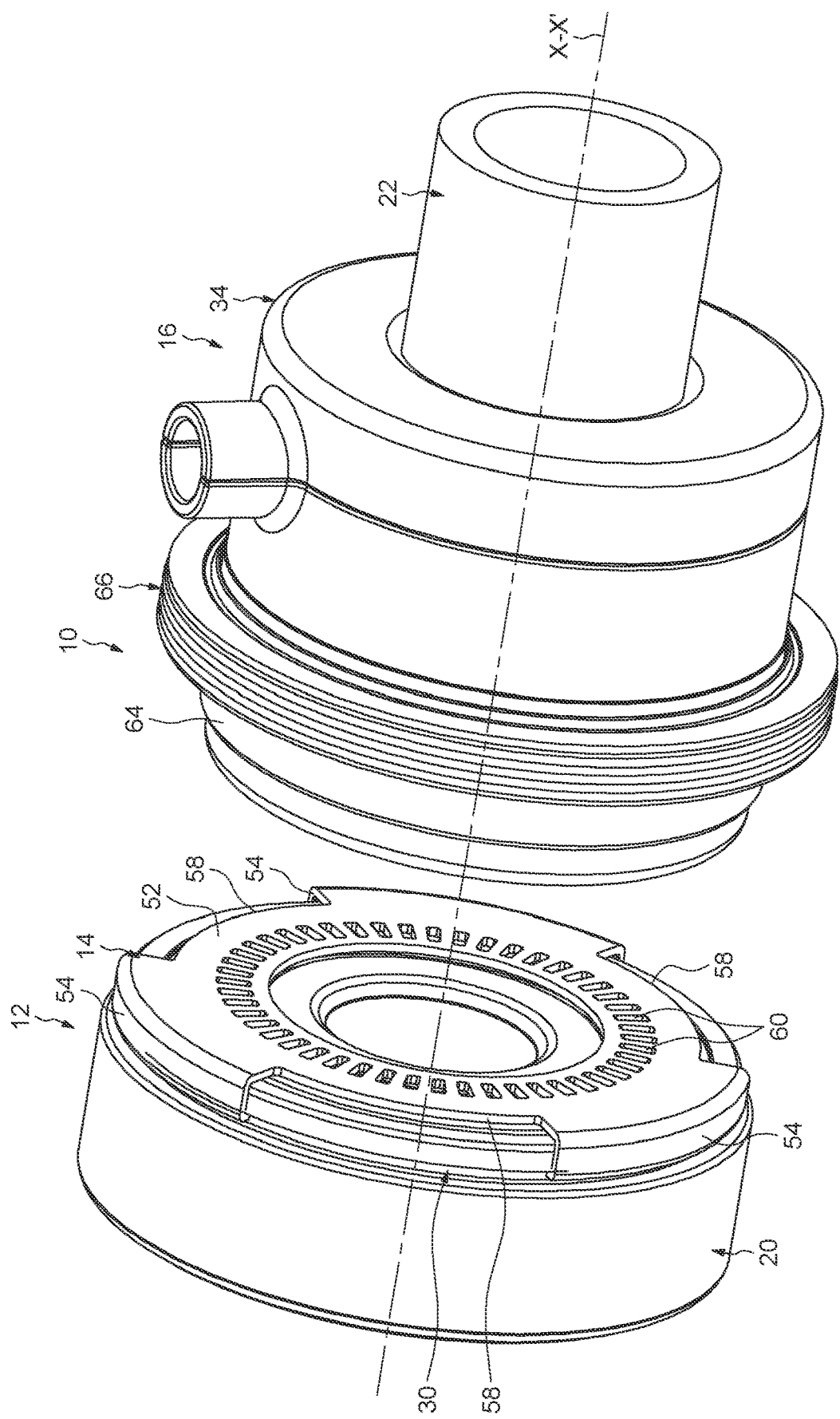
FIG. 2 is a perspective view of the sensor bearing assembly of FIG. 1.

As shown in FIGS. 1 and 2, the sensor bearing assembly 10 comprises a bearing 12, and an impulse ring 14 and a sensor device 16 mounted on the bearing.

The bearing 12 comprises an inner ring 18 and an outer ring 20. The inner and outer rings 18, 20 are concentric and extend axially along the bearing rotation axis X-X' which runs in an axial direction. The outer ring 20 radially surrounds the inner ring 18. The inner and outer rings 18, 20 are made of steel.

As will be described later, the sensor bearing assembly 10 further comprises a spacer 22 axially abutting against the inner ring 18 of the bearing. The impulse ring 14 is secured to the outer ring 20 of the bearing and the sensor device 16 is secured to the spacer 22.

In the illustrated example, the bearing 12 also comprises a row of rolling elements 23, which are provided here in the form of balls, interposed between raceways (not referenced) formed on the inner and outer rings 18, 20.

The bearing 10 also comprises a cage 24 for maintaining the regular circumferential spacing of the rolling elements 23. The bearing 10 further comprises seals 26, 28 radially disposed between the inner and outer rings 18, 20 to define a closed space inside which the rolling elements 23 are arranged.

The outer ring 20 is provided with a cylindrical inner surface or bore 20a and with an outer cylindrical surface 20b which is radially opposite to the bore 20a. In the illustrated example, a toroidal circular raceway for the rolling elements 23 is formed from the bore 20a, the raceway being directed radially inwards. Two grooves (not referenced) are also formed on the bore 20a into which are secured the seals 26, 28.

In this example, the outer ring 20 is also provided with two opposite radial lateral faces 20c, 20d which axially delimit the bore 20a and the outer surface 20b of the ring.

A groove 30 is formed on the outer surface 20b of the outer ring. The groove 30 is oriented radially outwards, i.e. radially on the side opposite to the inner ring. The groove 30 extends radially inwards from the outer surface 20b of the outer ring. In the illustrated example, the groove 30 has an annular form.

The groove 30 is axially delimited by two side walls 30a, 30b. The side walls 30a, 30b axially face each other. The side walls 30a, 30b are axially spaced apart from each other. The groove 30 also comprises a bottom 30c connected to the side walls 30a, 30b. The outer surface 20b of the outer ring and the bottom 30c of the groove are radially offset. The bottom 30c is radially offset inward with regard to the outer surface 20b. The side walls 30a, 30b of the groove extend radially. The bottom 30c extends axially. The groove 30 has a U-shaped cross-section.

In the illustrated example, the outer surface 20b of the outer ring has a stepped shape. The outer surface 20b is provided with a first cylindrical portion 20b1 and with a second cylindrical portion 20b2 which is radially offset inwards, i.e. towards the inner ring 18, with respect to the first cylindrical portion 20b1. The diameter of the cylindrical portion 20b1 defines the outer diameter of the outer ring 20.

The groove 30 is axially interposed between the first and second cylindrical portions $20b_1$, $20b_2$. The side wall 30b of the groove axially delimits the first cylindrical portion 20b1. More precisely, the first cylindrical portion $20b_1$ is axially delimited by the lateral face 20d and the side wall 30b. The side wall 30a of the groove axially delimits the second cylindrical portion 20b2. More precisely, the second cylindrical portion 20b2 is axially delimited by the lateral face 20c and the side wall 30a.

Similarly to the outer ring 20, the inner ring 18 is provided with a cylindrical inner surface or bore 18a and with an outer cylindrical surface 18b which is radially opposite to the bore 18a. In the illustrated example, a toroidal circular raceway for the rolling elements 23 is formed from the outer surface 18b, the raceway being directed radially outwards.

The inner ring 18 is also provided with two opposite radial lateral faces 18c, 18d which axially delimit the bore 18a and the outer surface 18b of the ring.

The spacer 22 has an annular form. The spacer 22 axially abuts against the lateral face 18c of the inner ring. The spacer 22 does not protrude axially into the bore 18a of the inner ring. The spacer 22 is provided with a cylindrical inner surface or bore 22a and with an outer cylindrical surface 22b which is radially opposite to the bore 22a. The inner diameter of the spacer 22 is equal to the inner diameter of the inner ring 18 of the bearing. In other words, the diameter of the bore 22a of the spacer is equal to the diameter of the bore 18a of the inner ring.

The spacer 22 is also provided with two opposite radial lateral faces 22c, 22d which axially delimit the bore 22a and the outer surface 22b of the sleeve. The lateral face 22d of the spacer comes into axially contact against the lateral face 18c of the inner ring. The spacer 22 may be made of steel.

As previously indicated, the sensor device 16 is secured onto the spacer 22. The sensor device 16 is secured onto the outer surface 22b of the spacer.

The sensor device comprises a sensor body or housing 34 and sensor elements (not shown) supported by the sensor housing 34. The sensor device 16 also comprises a printed circuit board 36 secured to the sensor housing 34 and supporting the sensor elements.

The sensor housing 34 has an annular form. The sensor housing 34 is axially offset with respect to the bearing 12 and the impulse ring 14. The sensor housing 34 remains axially spaced apart from the bearing 12 and the impulse ring 14. The sensor housing 34 is fixedly secured onto the spacer 22. The sensor housing 34 is fixedly secured onto the outer surface 22b of the spacer. The sensor housing 34 is not able to slide or rotate relative to the spacer 22.

In this example, the outer diameter of the sensor housing 34 is smaller than the outer diameter of the outer ring 20 of the bearing.

The sensor housing 34 comprises an annular outer axial portion 38, an annular inner axial portion 40 secured onto the spacer 22 and opposite annular radial portions 42, 44 extending between the outer and inner axial portions. The outer and inner axial portions 38, 40 are concentric and coaxial with the axis X-X'. The inner axial portion 40 is fixedly secured onto the outer surface 22b of the spacer.

The outer surface of the outer axial portion 38 forms the outer surface of the sensor housing 34. The outer diameter of the outer axial portion 38 defines the outer diameter of the sensor housing 34. The outer diameter of the sensor housing 34 is smaller than the outer diameter of the outer ring 20 of the bearing. Alternatively, the outer diameter of the sensor housing 34 may be equal to the outer diameter of the outer ring 20.

The outer axial portion 38 of the sensor housing radially surrounds the inner axial portion 40. The outer axial portion 38 extends axially from the radial portion 42 towards the bearing 12. The outer axial portion 38 extends axially from a large-diameter edge of the radial portion 42.

The inner axial portion 40 defines the bore of the sensor housing 34. The inner axial portion 40 is secured to the spacer 22. The inner axial portion 40 extends axially from the radial portion 42 towards the bearing 12. The inner axial portion 40 extends axially from a small-diameter edge of the radial portion 42. The radial portion 42 is located at one end of the outer and inner axial portions 38, 40. The radial portion 44 is located at the opposite end of the outer and inner axial portions 38, 40. The radial portion 44 axially faces the bearing 12 and the impulse ring 14. The radial portion 44 remains axially spaced apart from the bearing 12 and the impulse ring 14.

The sensor housing 34 defines an annular closed space 46 inside which is located the printed circuit board 36. The space 46 is radially delimited by the outer and inner axial portions 38, 40. The space 46 is axially delimited by the radial portions 42, 44.

In the illustrated example, the sensor housing 34 also comprises a cable output 48 inside which is intended to engaged a cable (not shown) for transmitting sensing data. The cable output 48 forms a protruding portion extending radially outwards from the outer surface of the sensor housing 34. The cable output 48 protrudes radially outwards from the outer axial portion 38 of the sensor housing. Only the cable output 48 radially protrudes outwards with respect to the outer surface of the sensor housing 34.

In the illustrated example, the cable output 48 has a tubular form. Alternatively, the cable output 48 may have other shapes, for example a rectangular parallelepiped form. The cable engaged inside the cable output 48 comprises several electrical wires (not shown) connected to the printed circuit board 36.

In the disclosed example, the sensor device 16 is provided with the connecting cable for transmitting sensing data. Alternatively, the connecting cable may be omitted from the sensor device 16 when wireless sensor elements are used. In this case, the sensor housing 34 does not include the cable output 48.

In the illustrated example, the sensor body 34 is made in two parts stacked one relative to the other in the axial direction. The sensor body 34 is made of a synthetic material. For example, the sensor body 34 may be made of Nylon 66 (PA 6.6) or Polybutylene terephthalate (PBT). Alternatively, the sensor body 34 can also be made from other materials, for example steel. The sensor body 34 may be secured to the spacer 22 by any appropriate means, for example by overmolding, gluing, plastic welding, etc.

The printed circuit board 36 is secured to the sensor housing 34. The printed circuit board 36 is housed inside the space 46 defined by the sensor housing 34. In the illustrated example, the printed circuit board 36 is secured to the radial portion 44 of the sensor body axially facing the impulse ring 14 and the bearing 12. The printed circuit board 36 is axially mounted against the radial portion 44. Alternatively, the printed circuit board 36 may be secured to the inner axial portion 40 or to the outer axial portion 38 of the sensor body.

The sensor elements are supported by the printed circuit board 36 which is itself supported by the sensor housing 34. As will be described later, the sensor elements are mounted on the printed circuit board 36 axially on the side of the radial portion 44 of the sensor body.

As previously mentioned, the impulse ring 14 is secured to the outer ring 18. The impulse ring 14 is secured onto the outer surface 20b of the outer ring. The impulse ring 14 is secured into the groove 30 formed on the outer surface 20b. As will be described later, the outer diameter of the impulse ring 14 is smaller than the outer diameter of the outer ring 20. The impulse ring 14 radially surrounds the spacer 22. In the disclosed example, the impulse ring 14 is made in one part. The impulse ring 14 is made of metal.

Figure 3:
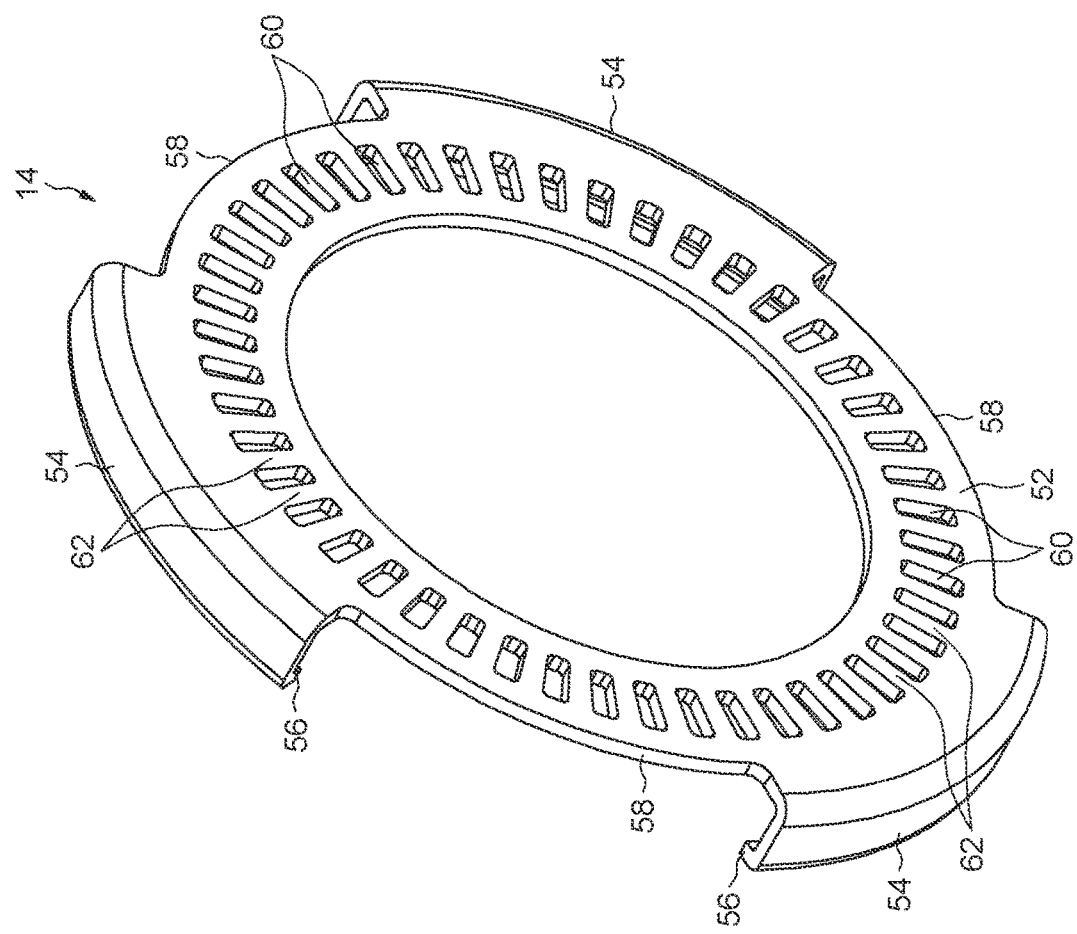
FIG. 3 is a perspective view of an impulse ring of the sensor bearing assembly of FIGS. 1 and 2.

As shown in FIGS. 1 to 3, the impulse ring 14 comprises an annular radial portion 52 and a plurality of outer axial lugs 54 extending axially from the radial portion 52. Each lug 54 extends axially from a large-diameter edge of the radial portion 52. The lugs 54 are spaced apart in the circumferential direction, here regularly. The lugs 54 are here identical one to another. In the illustrated example, three lugs 54 are provided. Alternatively, a different number of lugs 54 may be foreseen, for example at least two lugs. For example, each lug 54 may extend over an angular sector of from 35° to 55°, and preferably be equal to 45°.

In the illustrated example, a slight axial gap is provided between the impulse ring 14 and the lateral face 20c of the outer ring. The radial portion 52 of the impulse ring axially faces the lateral face 20c. Alternatively, the impulse ring 14 may be mounted axially against the lateral face 20c. In this case, the radial portion 52 of the impulse ring axially faces the lateral face 20c and also comes into axial contact with the lateral face 20c.

The lugs 54 are mounted radially around the outer surface 20b of the outer ring. Each lug 54 radially comes into contact with the outer surface 20b. Each lug 54 radially comes into contact with the second cylindrical portion 20b2 of the outer surface. Each lug 54 is radially offset inwards, towards the inner ring 18, with respect to the first cylindrical portion 20b1 of the outer surface of the outer ring. The impulse ring 14 is entirely radially offset inwards with respect to the first cylindrical portion 20b1. The outer surface of the lugs 54 defines the outer diameter of the impulse ring 14. The outer diameter of the impulse ring 14 is smaller than the outer diameter of the outer ring 20. Alternatively, the outer diameter of the impulse ring 14 may be equal to the outer diameter of the outer ring 20.

Each lug 54 is provided with a hook 56 extending radially inwards and engaged inside the groove 30 formed on the outer surface of the outer ring to axially retain the impulse ring 14 relative to the outer ring. Each hook 56 axially abuts against the side wall 30a of the groove. Each hook 56 is provided at the free end of the associated lug 54. Each hook 56 and the associated lug 54 have an L-shaped cross-section. The lugs 54 and the hooks 56 together form a snapping portion of the impulse ring 14.

As previously mentioned, in the illustrated example, the impulse ring 14 is provided with a plurality of axial lugs 54. Alternatively, the impulse ring 14 may be provided with an annular axial portion extending axially from the radial portion 52 and with the hooks 56 or with an annular hook engaged inside the groove 30 of the outer ring. In such case, the annular axial portion and the hooks 56, or the annular hook, form together the snapping portion of the impulse ring 14.

In the illustrated example, the impulse ring 14 is provided with a plurality of through-openings 58 formed on the radial portion 52. The openings 58 extend through the axial thickness of the radial portion 52. The openings 58 are spaced apart in the circumferential direction, here regularly. The openings 58 are here identical one to another. In the illustrated example, three openings 58 are provided. Alternatively, a different number of openings 58 may be foreseen, for example only one opening, or at least two openings 58. For example, each opening 58 may extend over an angular sector from 35° to 55°, and preferably be equal to 45°. Alternatively, it is possible to foresee another angular size for the openings 58. In the illustrated example, each through-opening 58 is circumferentially disposed between two successive lugs 54 while being radially offset inwards. Each through-opening 58 opens radially outwards. With the through-openings 58, the radial portion 52 is provided at its periphery with radial sectors, here three. Alternatively, the impulse ring 14 may be provided of opening and lug.

Each through-opening 58 is formed on the radial portion 52 such that a part of the lateral face 20c of the outer ring is accessible from the outside through the opening 58. In other words, each opening 58 of the radial portion 52 leaves exposed a part of the lateral face 20c of the outer ring. As will be described later, the through-openings 58 of the impulse ring enable a tool to axially push directly on the outer ring 20 of the bearing during the installation of the sensor bearing assembly 10.

Each through-opening 58 is formed on the radial portion 52 of the impulse ring to be radially located between the bore 20a and the outer surface 20b of the outer ring. Each through-opening 58 is radially offset outwards with respect to the bore 20a and radially offset inwards with respect to the outer surface 20b. The inner diameter of each through-opening 58 is larger than the diameter of the bore 20a, and its outer diameter is smaller than the diameter the outer surface 20b.

In this example, the impulse ring 14 is also provided with a plurality of through slots or apertures 60 regularly spaced apart in the circumferential direction. The apertures 60 extend through the axial thickness of the radial portion 52. The apertures 60 are radially offset inwards with regard to the through-openings 58. A tooth 62 is formed between each pair of successive apertures 60. Hence, the impulse ring 14 is provided with alternating teeth 62 and apertures 60.

As previously mentioned, each sensor element (not shown) is mounted on the printed circuit board 36 axially on the side of the radial portion 44 of the housing. Each sensor element cooperates with the impulse ring 14 through the radial portion 44 of the housing. The sensor elements are disposed on the same diameter on the printed circuit board 36. Each sensor element is radially aligned with one of the teeth 62 or apertures 60 of the impulse ring. The sensor elements are regularly spaced apart in the circumferential direction. For example, the sensor device 16 may comprise three sensor elements. Alternatively, a different number of sensor elements may be foreseen, for example one or two sensor elements or at least four sensor elements.

Preferably, the sensor elements use induction technology. Each sensor element may include an inductive switch sensor such as a sensing coil. The switch of each sensor element is triggered by the metal impulse ring 14. The teeth 62 and apertures 60 of the impulse ring are used as differential inductance field references.

As an alternative, the impulse ring 14 and the sensors element may use any other suitable technology instead of induction technology. For example, optical technology or magnetic technology may be implemented. In the case of magnetic technology, the impulse ring 14 may include alternating North and South poles and the sensor elements may include Hall-effect sensors. In the case of optical technology, the radial portion 44 may be transparent.

In the illustrated example, the sensor bearing assembly 10 further comprises a friction ring 64 mounted on the outer surface of the sensor housing 34. The friction ring 64 is mounted on the outer surface of the outer axial portion 38 of the sensor housing. The friction ring 64 has an annular form. The outer diameter of the friction ring 64 is smaller than the outer diameter of the outer ring 20 of the bearing. Alternatively, the outer diameter of the friction ring 64 may be equal to the outer diameter of the outer ring 20. The friction ring 64 may be made of steel or plastic material. The friction ring 64 is secured to the sensor housing 34 by any appropriate means, for example by gluing, by overmolding, etc.

The sensor bearing assembly 10 also comprises a seal 66 arranged around the friction ring 64 and coming into radial friction contact with the ring. The seal 66 radially surrounds the friction ring 64.

The seal 66 is provided with an annular heel 66a and with two annular friction lips 66b projecting from the heel. Each friction lip 66b extends inwardly from the heel 66a. Each friction lip 66b extends obliquely. One of the friction lips 66b extends obliquely on the side of the bearing 12 while the other lip 66b extends obliquely on the opposite side.

Each lip 66b of the seal comes into friction contact with the friction ring 64. Each lip 66b of the seal comes into friction contact with the outer surface of the friction ring 64. The contact between each lip 66b and the friction ring 64 is radial. The lips 66b are flexible in the radial direction. Preferably, the free end of each lip 66b has a triangular shape in cross-section in order to reduce friction. In the illustrated example, the seal 66 is provided with two lips 66b. Alternatively, the seal 66 may be provided with only one lip or with three or more lips. The seals 66 may be made of elastomeric material, for example polyurethane.

Figure 4:
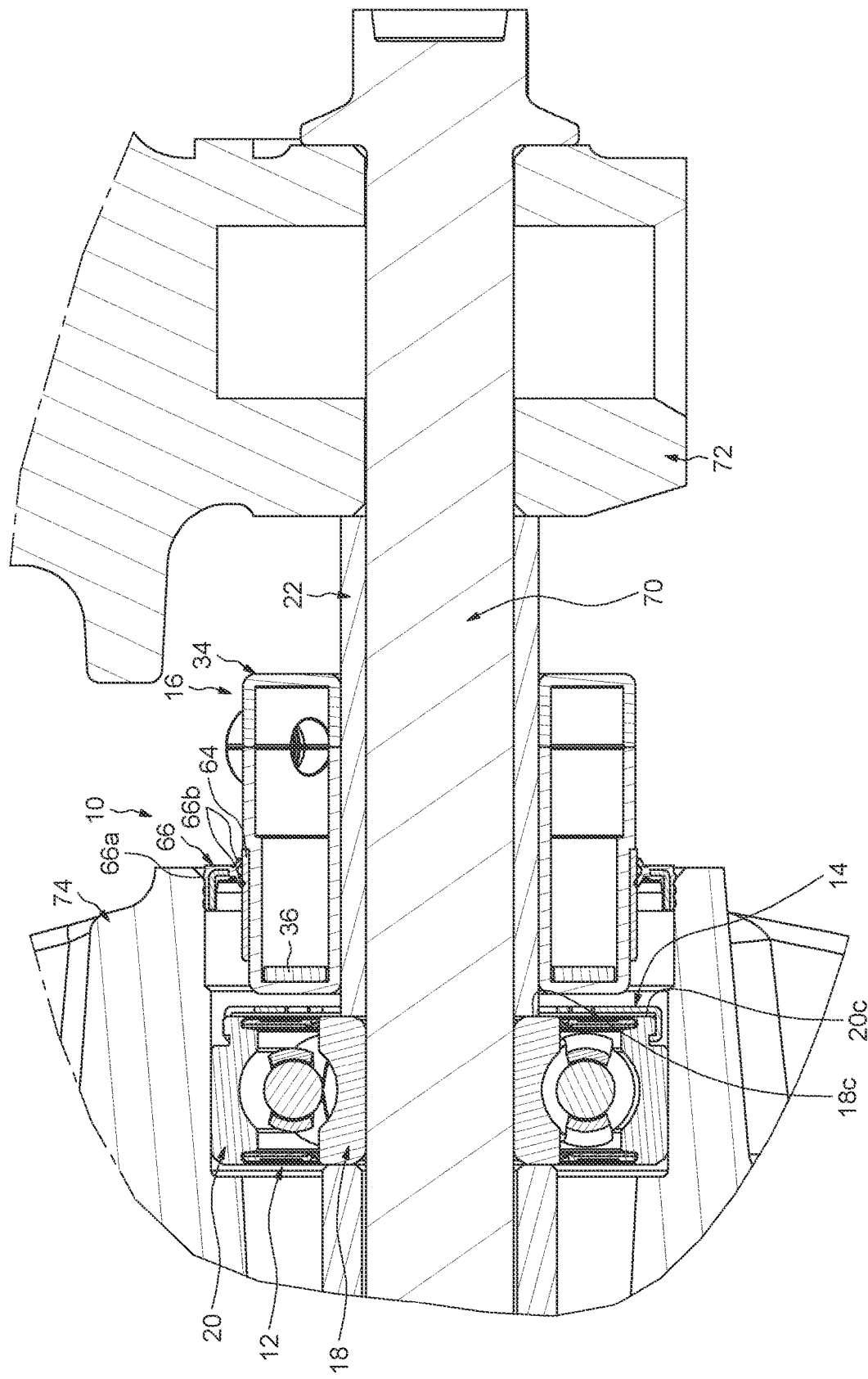
FIG. 4 is a partial axial section view of a two-wheeled vehicle provided with the sensor bearing assembly of FIGS. 1 and 2.

As previously mentioned, the sensor bearing assembly 10 is particularly adapted to equip a vehicle. As shown partially in FIG. 4, the sensor bearing assembly 10 is mounted on a shaft 70 of a wheel between two arms 72 of a fork (only one being visible in FIG. 4). The shaft 70 is provided with a wheel hub 74.

The sensor bearing assembly 10 is mounted into a bore of the wheel hub 74. The bearing 12 of the sensor bearing assembly is mounted into the bore of the wheel hub 74. The sensor housing 34 and the spacer 22 are partly located inside the wheel hub 74 and protrude axially outwards.

The inner ring 18 of the bearing is mounted on the shaft 70 of the wheel. The outer ring 20 is mounted into the bore of the wheel hub 74. The outer ring 20 is intended to rotate with the wheel hub 74 while the inner ring 18 is intended to be fixed.

Since the outer diameter of the impulse ring 14 is smaller than the outer diameter of the outer ring 20, there is no contact between the impulse ring and the wheel hub 74. Similarly, since the outer diameter of the sensor housing 34 is smaller than the outer diameter of the outer ring 20, there is no contact between the sensor housing and the wheel hub 74.

In order to mount the bearing 12 inside the wheel hub 74, a specific mounting tool (not shown) may be used. The mounting tool is provided here with three axial teeth spaced apart in the circumferential direction and configured to be engaged into one of the through-openings of the impulse ring 14 without contact with the impulse ring. Each tooth of the mounting tool extends through one of the openings of the impulse ring 14 and axially come into contact with the lateral face 20*c* of the outer ring of the bearing. The through-openings of the impulse ring 14 allow the teeth of the tool to axially abut directly on the lateral face 20*c* of the outer ring.

The axial contact between the teeth of the tool and the lateral face 20*c* of the outer ring is the only contact between the tool and the sensor bearing assembly 10. An axial force is exerted directly onto the lateral face 20*c* of the outer ring with the aid of the tool in order to mount the bearing into the wheel hub 74. Preferably, the outer ring 20 is press-fitted into the wheel hub 74. The through-openings of the impulse ring 14 enable a tool to axially push directly on the outer ring 20 of the bearing during the installation of the sensor bearing assembly 10 into the wheel hub 74.

The shaft 70 is mounted inside the bore of the inner ring 18 of the bearing and the bore of the spacer 22. The spacer 22 axially abuts against the lateral face 18*c* of the inner ring 18 at one end, and axially abuts against one of the arms 72 of the fork at the opposite end.

The heel 66*a* of the seal is mounted against the bore of the wheel hub 74. The seal 66 may be secured to the wheel hub 74 by press-fitting. The lips 66*b* of the seal prevent the exterior pollutants from going towards the impulse ring 14.

As previously mentioned, in the first illustrated example, the impulse ring 14 is secured to the outer ring of the bearing by snapping.

Alternatively, it could be possible to directly secure the impulse ring 14 to the outer ring of the bearing by other means for example by riveting over the lateral face 20*c* of the outer ring or by using dowel pins.

Figure 5:
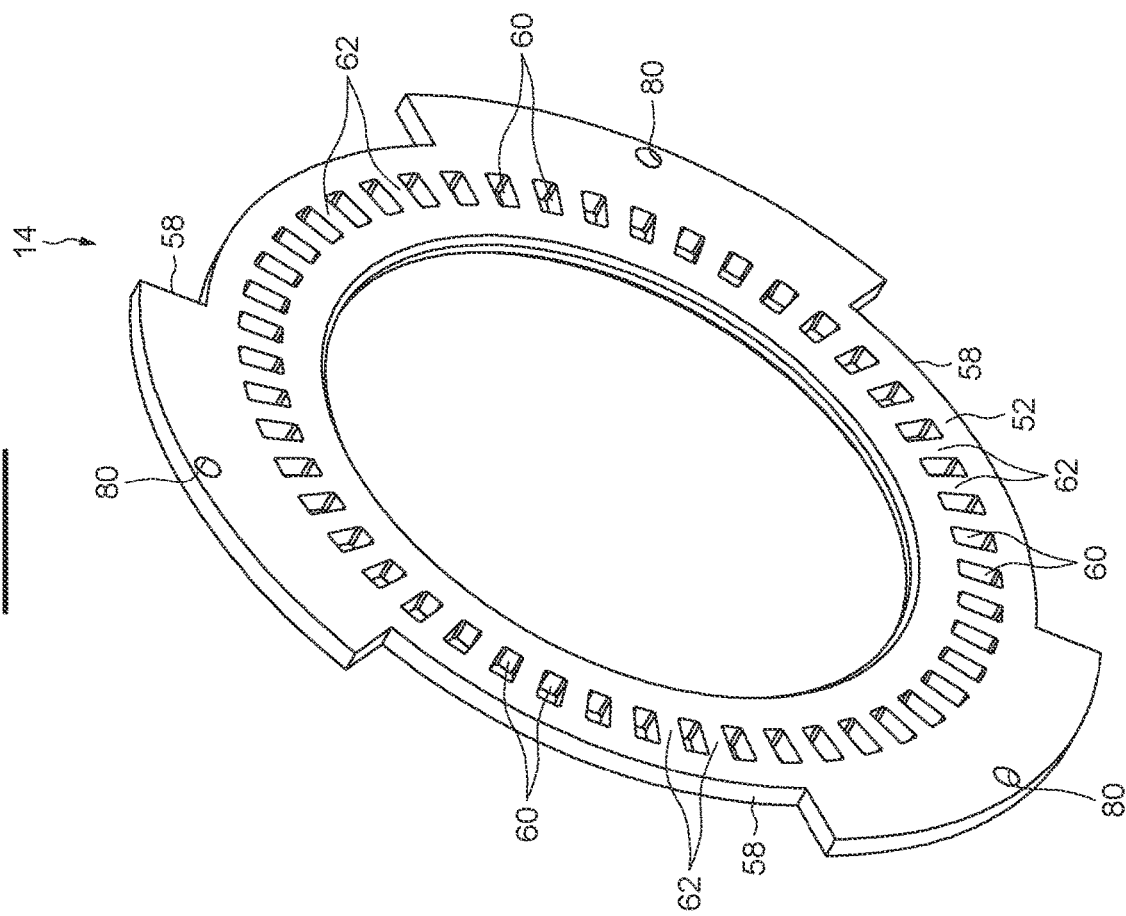
FIG. 5 is a perspective view of an impulse ring of a sensor bearing according to second example of the disclosure.

In such case, as shown in FIG. 5, the impulse ring 14 does not include lugs and has through-holes 80 formed on the radial portion 52. The holes 80 extend through the axial thickness of the radial portion 52. The rivets or the dowel pins (not shown) extend through the holes 80 of the impulse ring and into blind holes formed on the lateral face 20*c* of the outer ring in order to secure the impulse ring 14 to the outer ring. In the illustrated example, three through-holes 80 are provided on the impulse ring 14. Alternatively, a different number of through-holes 80 may be provided.

Figure 6:
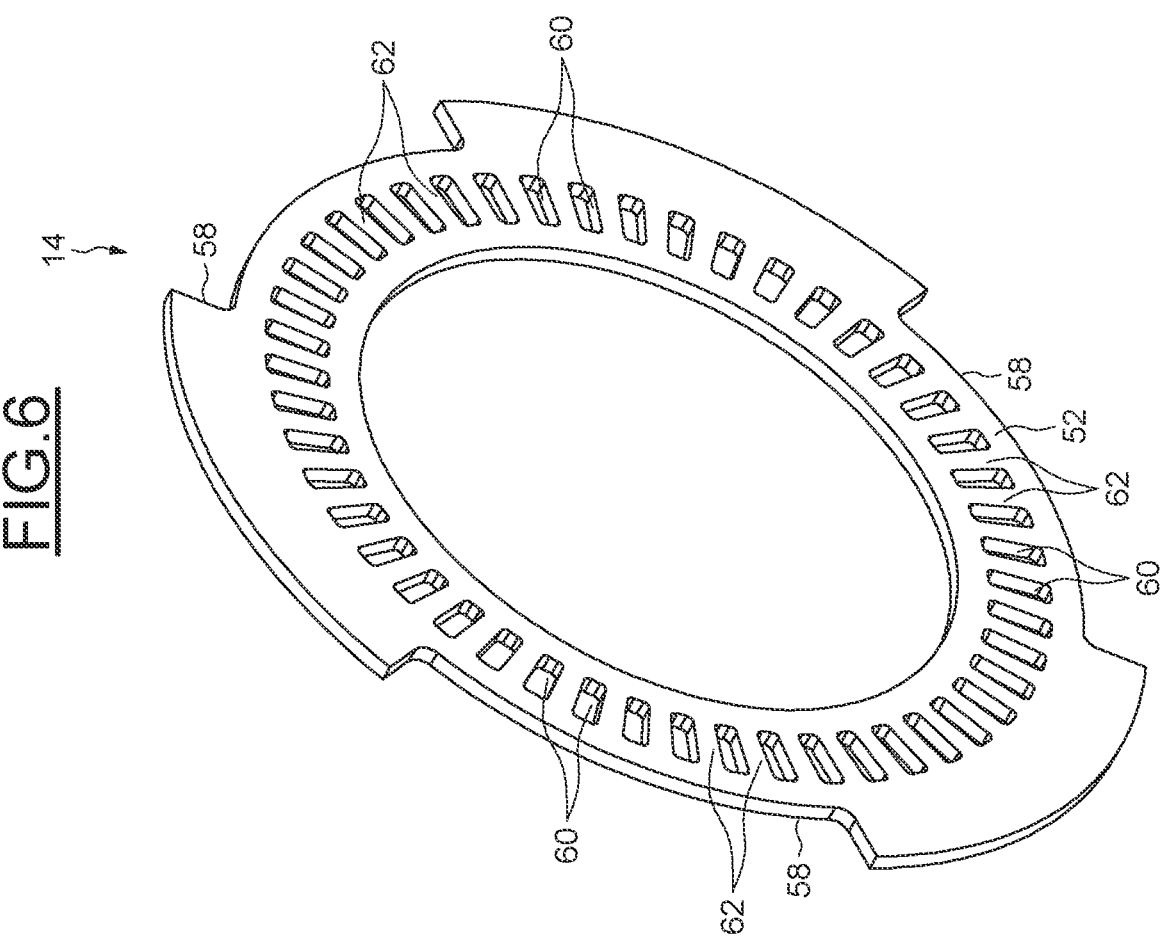
FIG. 6 is a perspective view of an impulse ring of a sensor bearing according to third example of the disclosure.

In another example, the impulse ring 14 as shown in FIG. 6 may be secured to the lateral face 20*c* of the outer ring by gluing.

With such impulse rings 14 as shown in FIGS. 5 and 6, it is not necessary to foresee a stepped shape for the outer surface of the outer ring of the bearing.

In the illustrated examples, the sensor bearing assembly is provided with a rolling bearing comprising one row of rolling elements. Alternatively, the rolling bearing may comprise at least two rows of rolling elements. In the illustrated examples, the rolling elements are balls. Alternatively, the rolling bearing may comprise other types of rolling elements, for example rollers. In another variant, the rolling bearing may also be provided with a sliding bearing having no rolling elements.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved sensor bearing units.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

What is claimed is:

1. A sensor bearing assembly comprising:
   a bearing having an inner ring and an outer ring centered on an axis,
   an impulse ring secured to the outer ring of the bearing,
   a sensor device for detecting rotational parameters of the impulse ring, the sensor device including a sensor housing and at least one sensor element supported by the sensor housing and cooperating with the impulse ring, and
   an annular spacer adapted to axially abut against a lateral face of the inner ring of the bearing,
   wherein the sensor housing is fixedly secured to the spacer,
   wherein the inner diameter of the spacer is equal to the inner diameter of the inner ring of the bearing,
   wherein the outer diameter of the impulse ring is less than or equal to the outer diameter of the outer ring of the bearing, wherein the sensor housing has a hollow interior having a volume, wherein the at least one sensor element is mounted in the hollow interior, and wherein the volume of the hollow interior is greater than a volume of the at least one sensor element.

2. The sensor bearing assembly according to claim 1, wherein the impulse ring includes a radial portion facing a lateral face of the outer ring of the bearing and at least one through-opening in the radial portion such that a part of the lateral face of the outer ring of the bearing is exposed.

3. The sensor bearing assembly according to claim 1, wherein the impulse ring is secured directly to the outer ring of the bearing.

4. The sensor bearing assembly according to claim 1, wherein the impulse ring is secured to a groove formed on the outer surface of the outer ring of the bearing.

5. The sensor bearing assembly according to claim 4, wherein the impulse ring is provided with a snapping portion engaged partly inside the groove of the outer ring, the snapping portion having an L-shape in cross-section.

6. The sensor bearing assembly according to claim 1, wherein the impulse ring is secured to the outer ring of the bearing by rivets or by dowel pins or by glue.

7. The sensor bearing assembly according to claim 1,
wherein the sensor housing comprises a radially inner cylindrical wall mounted on the annular spacer, a radially outer cylindrical wall surrounding and coaxial with the inner cylindrical wall and a first end wall axially spaced from a second end wall, the first and second end walls connecting the radially inner cylindrical wall to the radially outer cylindrical wall and defining a hollow interior of the annular spacer, and wherein the at least one sensor element is mounted at the first end wall.

8. The sensor bearing assembly according to claim 7,
wherein the first end wall and the second end wall are annular.

9. The sensor bearing assembly according to claim 1,
wherein the snapping portion of the impulse ring comprises a plurality of axial lugs spaced apart in a circumferential direction, each of the lugs being provided with a radial hook engaged inside the groove of the outer ring.

10. A sensor bearing assembly comprising:
a bearing having an inner ring and an outer ring centered on an axis,
an impulse ring secured to the outer ring of the bearing,
a sensor device for detecting rotational parameters of the impulse ring, the sensor device including a sensor housing and at least one sensor element supported by the sensor housing and cooperating with the impulse ring, and
an annular spacer adapted to axially abut against a lateral face of the inner ring of the bearing,
wherein the sensor housing is fixedly secured to the spacer,
wherein the inner diameter of the spacer is equal to the inner diameter of the inner ring of the bearing,
wherein the outer diameter of the impulse ring is less than or equal to the outer diameter of the outer ring of the bearing, and wherein the impulse ring includes a radial portion facing a lateral face of the outer ring of the bearing and at least one opening extending through a thickness of the radial portion such that a part of the lateral face of the outer ring of the bearing is accessible from the outside through the opening.

11. The sensor bearing assembly according to claim 10, wherein the impulse ring comprises a plurality of circumferentially spaced openings.

12. The sensor bearing assembly according to claim 10,
wherein the snapping portion of the impulse ring comprises a plurality of axial lugs spaced apart in a circumferential direction, each of the lugs being provided with a radial hook engaged inside the groove of the outer ring.

13. The sensor bearing assembly according to claim 10, wherein the impulse ring is secured directly to the outer ring of the bearing.

14. The sensor bearing assembly according to claim 10, wherein the impulse ring is secured to a groove formed on the outer surface of the outer ring of the bearing.

15. A sensor bearing assembly comprising:
a bearing having an inner ring and an outer ring centered on an axis,
an impulse ring secured to the outer ring of the bearing,
a sensor device for detecting rotational parameters of the impulse ring, the sensor device including a sensor housing and at least one sensor element supported by the sensor housing and cooperating with the impulse ring, and
an annular spacer adapted to axially abut against a lateral face of the inner ring of the bearing,
wherein the sensor housing is fixedly secured to the spacer,
wherein the inner diameter of the spacer is equal to the inner diameter of the inner ring of the bearing,
wherein the outer diameter of the impulse ring is less than or equal to the outer diameter of the outer ring of the bearing,
wherein the impulse ring is secured to a groove formed on the outer surface of the outer ring of the bearing,
wherein the impulse ring is provided with a snapping portion engaged partly inside the groove of the outer ring, the snapping portion having an L-shape in cross-section, and
wherein the snapping portion of the impulse ring comprises a plurality of axial lugs spaced apart in a circumferential direction, each of the lugs being provided with a radial hook engaged inside the groove of the outer ring.

16. The sensor bearing assembly according to claim 15,
wherein the impulse ring includes a radial portion facing a lateral face of the outer ring of the bearing and at least one opening extending through a thickness of the radial portion such that a part of the lateral face of the outer ring of the bearing is accessible from the outside through the opening, and
wherein one of the at least one opening is disposed circumferentially between two adjacent axial lugs.

\* \* \* \* \*